April 2, 1935. W. K. SIMPSON 1,996,309

PACKLESS VALVE

Filed Jan. 26, 1932

Inventor
William K. Simpson
by Wright, Brown, Quinby & Mary
Attys

Patented Apr. 2, 1935

1,996,309

UNITED STATES PATENT OFFICE 1,996,309

PACKLESS VALVE

William K. Simpson, Waterbury, Conn., assignor to Hoffman Specialty Company, Waterbury, Conn., a corporation of Illinois Application January 26, 1932, Serial No. 588,969

8 Claims. (Cl. 251—31)

The present invention relates to valves of the type which are made leakage tight by the employment of a flexible, impervious member in the nature of a diaphragm connected in a fluid tight manner at its opposite boundaries respectively with the casing and the valve proper or spindle of the valve. Such packless valves are particularly useful as inlet valves for the radiators of steam heating systems, where the pressure within the radiator may be either greater or less than the atmospheric pressure, and where leakage of air under vacuum conditions within the system is objectionable.

Valves of this type, employing a fluid tight diaphragm instead of the more common packing within which the valve spindle is rotatable and movable endwise slidingly, have long been known and used, with the employment of diaphragms of various types and forms. I make no claim of original invention to the generic characteristics of such valves. Instead my objects and accomplishment have been to improve and simplify valves of this type in matters of detail, principally in the combination and assemblage with the valve casing of means for reciprocating the spindle by the action of a rotatable handle, and means for preventing rotation of the valve spindle and relieving the diaphragm of tortional stress. An important object of the invention therefore has been to provide improved and simple means for these purposes which may be made and assembled with a minimum of cost.

The precise nature of the invention and the particulars in which it consists are explained in the following specification and set forth in the claims, with reference to the drawing. The illustrative embodiment of the invention represents an inlet valve for a steam heating radiator, but this is by way of illustration and not of limitation as to use.

In the drawing,—

Figure 1:
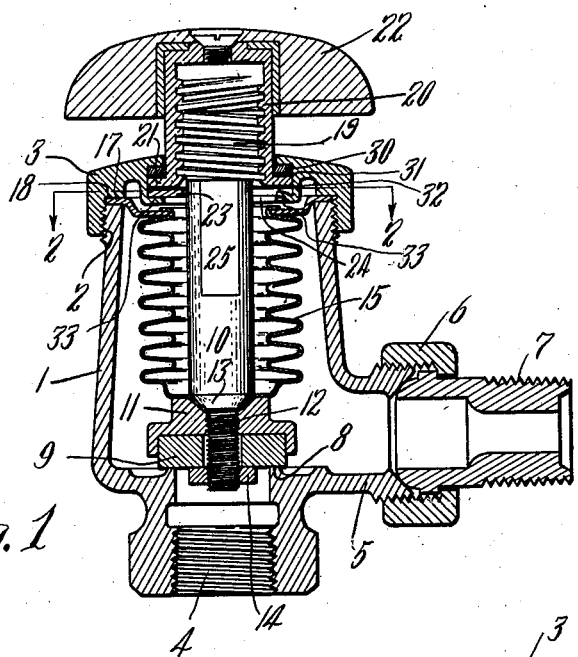
Fig. 1 is a central vertical section of a radiator valve embodying the invention.
Figure 2:
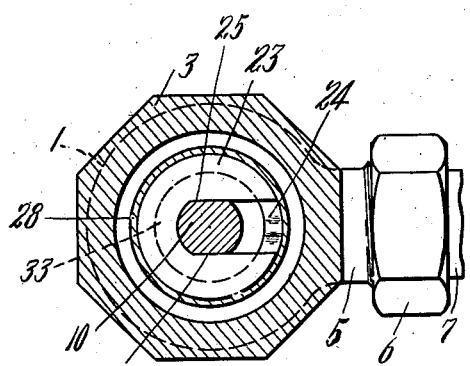
Fig. 2 is a sectional plan view taken on line 2—2 of Fig. 1.
Figure 3:
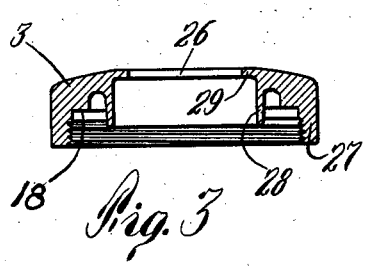
Fig. 3 is a sectional view of the cover or cap of the valve casing prior to its assemblage with associated parts.

The numeral 1 represents the casing of the valve which has a wide, open, upper end externally threaded at 2 to secure a cover or cap 3; an internally threaded inlet passage 4 for connection with a steam supply pipe; and an externally threaded outlet branch 5 in its side to receive a coupling nut 6 by which the casing is connected to a nipple 7 adapted to be screwed into the inlet opening of a radiator. The inner end of the inlet passage is surrounded by a valve seat 8 with which cooperates a valve body 9 carried by a spindle 10. Preferably the valve body is set into the face of a head or holder 11, screwed upon a reduced threaded shank extension 12 of the spindle against a shoulder 13, and is secured by a lock nut 14 on the extremity of said shank.

The leakage preventing diaphragm 15 is of familiar corrugated tubular form, made as a cup drawn from sheet metal and shaped with deep encircling folds in its sides. Its bottom is centrally perforated for passage of the shank 12, and the zone surrounding such perforation is tightly clamped between shoulder 13 of the spindle and a complemental surface on the valve head 11, these surfaces being preferably beveled as shown, and being set up tightly against the diaphragm so as to make a fluid tight joint. The joint may be further reinforced and hermetically sealed by solder if desired. The opposite boundary of the diaphragm is made by a ring or washer 17 clamped between the end wall of the casing 1 and a shoulder 18 of cap 3; the open end of the corrugated tube or cup being curled around the interior edge of the ring, and the joint between contiguous surfaces of the ring and cup being sealed by solder. I use the term "diaphragm" in a generic sense herein, to include not only the specific bellows form of diaphragm here illustrated, but the bulged disk and other equivalent forms of diaphragm as well, whether made of one piece or a number of pieces and of any material having suitable flexibility, impermeability and durability for the purposes in view.

The upper end of the valve spindle protrudes through the cover 3 and is provided with an enlarged head 19 formed with external screw threads of comparatively steep pitch or lead, so that a moderate degree of rotation of the surrounding nut 20 will produce an appreciable endwise movement of the spindle. The nut referred to is a sleeve or thimble, internally threaded to fit the head 19 and having a flange 21 on its inner or lower end, seated within the cover 3 in a manner later described. A handle, which may be a knob 22, or an equivalent lever arm, is secured in any suitable way to the nut.

Rotation of the spindle is prevented, so as to relieve the diaphragm of torsional strain when the nut is rotated, by a disk 23, having a notch 24 opening from one edge and extending across its center, the width of which is narrower than the diameter of the spindle. The spindle is flattened at opposite sides over areas indicated at 25 to fit freely within the notch, such sides cooperating with the boundaries of the notch when the disk is in place to withhold the spindle from rotation while permitting axial movement thereof. The cover or cap for the valve casing is made with a central hole 26 in its end wall of a diameter to fit freely around the nut 20, with a peripheral rib 27 internally threaded to mate with the threads 2 of the body, and with an intermediate cylindrical rib or wall 28 coaxial with the opening 26 but of larger diameter, whereby it surrounds a recess which is partially bounded at one end by the flange 29, and is open through its full width at the opposite end. The diameter of this recess is slightly larger than that of flange 21 on the nut 20, whereby to receive the latter freely.

The parts above described are assembled as follows: With the cover removed from the valve body, a spring washer 30 is placed in the central recess of the cover and against flange 29. A thin anti-friction washer 31 is laid against the spring washer, and the nut 20 is passed through the hole 26 until its flange comes to bear against the anti-friction washer. Or the anti-friction washer and spring washer may be passed over the nut until they rest on the flange 21 thereof, and all three placed at once in the cover. The valve spindle must now be screwed into the nut, or it may be screwed into it before the above described steps of assemblage are taken. A second anti-friction washer 32 is placed against the opposite side of the flange 21 and the notched disk 23 is passed over the spindle and into the recess. Originally the length of the wall 28 from shoulder 29 is greater than the combined thickness of the washers 30, 31, 32, disk 23 and flange 21. Finally the extremity of the wall 28 is spun or pressed over the rim of the holding disk 23 and against the outer face thereof, forming a securing flange 33; and that part of said flange which crosses the open end of notch 24 in the retaining disk is offset into the notch and provides a key to lock the disk against rotation.

The diaphragm may be assembled with the valve spindle and clamped by the holder portion 11 of the valve before or after the foregoing stages of assembling have been completed; but preferably before so that the valve holder may be more readily and certainly screwed up leakage tight against the diaphragm.

The parts of this assemblage are securely connected together independently of the valve casing and may be applied to and removed from the casing as a unit. The bounding ring 17 of the diaphragm bears on the shoulder 18 in the cover within the threaded flange 20 thereof and is pressed by such shoulder against the end face of the casing wall when the cover is screwed into place. A compressible gasket may, if necessary to make a tighter joint, be placed between the ring 17 and the casing. The external periphery of the cover is preferably made of polygonal outline, like a nut, so that it may be screwed tightly on to the casing by an ordinary wrench.

Although some variations may be made in the order of assembling the parts, above noted, the locking disk 23 must in any event be passed over the spindle and placed in the central recess of the cover before the end of the circular bounding wall of the recess is flanged over. However, this disk need not be placed over the spindle before the diaphragm is made fast thereto, but may be passed over afterwards; its open notch permitting this action. Thus the notched formation of the disk serves a double purpose; that of permitting assemblage with the spindle after the diaphragm has been clamped as tightly as needed, and that of providing a keyway for the locking key which prevents its independent rotation. After the retaining wall has been flanged over this disk is positioned and locked entirely by the cover and without any necessity of clamping cooperation between the cover and the valve casing for that purpose.

The anti-friction washers 31, 32 and the spring washer 30 are provided in order to permit easier rotation of the nut and cause less wear than would occur if the nut flange were engaged directly with the cover flange on one side and with the locking disk on the other. Where the cover, the nut, and the locking disk are made of brass or bronze, the anti-friction washers are preferably of a nickel silver alloy. Other anti-friction materials may, however, be used with bronze and other metals or alloys of which the structural and operating parts of the valve may be made. The spring washer 30 may be made as a ring bent or offset out of a true plane so as to be put under stress when the retaining wall is flanged over, and to exert a uniform resistance to the rotation of the nut.

The novelty of the present invention resides in the improved construction and assemblage of the rotation preventing disk with the valve spindle, spindle operating nut, and valve casing cover, and the further combination thereof with the essential parts of a packless valve. I make no claim herein, apart from such combination, to the principle or details of a diaphragm in substitution for packing as the leakage preventing means. But within the scope of the combinations which I do claim, any type and design of diaphragm may be used suitable to the construction otherwise of the valve and to its capacity and the extent of its required opening and closing movement.

What I claim and desire to secure by Letters Patent is:

1. A cover for a valve casing having a central aperture, a valve spindle passing through said aperture having a threaded head and flattened sides adjacent to the head, a nut threaded on said head and having an external flange, and a disk surrounding the spindle having interior edges engaging the flat sides of the spindle to prevent rotation thereof, the cover having retaining walls or flanges at one side of the flange of the nut and at the opposite side of the disk, together with means for preventing independent rotation of the disk.

2. A cover for a valve casing having a central opening in one end and a concentric enlarged recess obstructed at one end by the rim of said opening, a nut passing through the opening having an external flange in the recess, a spring washer between said nut flange and the end wall of the recess, a valve spindle having a threaded head meshed within the nut and flattened opposite sides adjacent to the head, a rotation preventing disk in the recess of the head, having a notch opening from one side, the sides of which notch engage the flat sides of the spindle to prevent independent rotation of the spindle, and a flange on the cover extending across the rim of said disk at its outer side and being offset into the open end of the notch to prevent independent rotation of the disk.

3. A cover for a valve casing having an opening, a valve spindle passing through said opening having an externally threaded head and being flattened at the side adjacent to the head, a nut meshing with said threads having an external flange, retaining walls on the cover flanking said flange, anti-friction washers at either side of said flange between the same and said retaining walls, and means coupled exclusively with the cover in cooperation with the flat side of the spindle to prevent independent rotation of the spindle.

4. A packless steam valve comprising a casing having an inlet, an outlet and an open end opposite to the inlet, a cover detachably secured to the casing over its open end, a valve arranged to open and close the inlet by movement toward and away from the inlet, a valve spindle connected to the valve and passing through the cover having a threaded head on its outer end, a diaphragm clamped at its outer boundary between the valve casing and cover and at its inner boundary between the valve and valve spindle, a notched disk embracing the spindle, its notch being of less width than the diameter of the spindle, and that part of the spindle which occupies the notch being of reduced thickness and non-circular section, a nut on the spindle head having an external flange, and retaining walls on the cover embracing said flange and disk preventing axial movement thereof, and one of said walls protruding into said notch to prevent rotation of the disk.

5. A valve as set forth in claim 4 comprising further a spring washer confined between the flange of the nut and one of said retaining walls.

6. A valve as set forth in claim 4 comprising further a spring washer between one of said retaining walls and the flange of the nut, and anti-friction washers located at opposite sides of said flange and between the latter and the spring washer on one hand and the disk on the other hand.

7. A packless valve comprising the combination with a casing having a valve seat and a detachable cover for said casing, of a valve body coperative with said valve seat, a spindle carrying the valve body and having a threaded head, a nut meshing with such head and rotatably supported by said cover, a disk having rotation-preventing engagement with the spindle, means constituted by a structural part of the cover exclusively interlocked with said disk to prevent rotation thereof relatively to the cover, and a diaphragm in leakage preventing connection with the spindle and the casing.

8. A cover for attachment to a valve casing having a central passage, a nut rotatably seated in said passage and having an encircling flange, a valve spindle having a threaded head contained in said nut in mesh with the threads thereof, and a disk in rotation-preventing slidable connection with the valve spindle; the cover having retaining walls embracing said flange and disk, and the disk having a notch which is interlocked with a portion of said retaining walls to prevent rotation of the spindle relatively to the cover when the nut is turned.

WILLIAM K. SIMPSON.